(12) United States Patent
Chonan et al.

(10) Patent No.: US 7,247,371 B2
(45) Date of Patent: Jul. 24, 2007

(54) ANTIMONY TIN OXIDE FINE PARTICLES FOR SUNLIGHT SHIELDING, AND DISPERSE LIQUID FOR FORMATION OF SUNLIGHT SHIELDING SOLID, SUNLIGHT SHIELDING SOLID, AND TRANSPARENT SUBSTRATE FOR SUNLIGHT SHIELDING USING THEREOF

(75) Inventors: Takeshi Chonan, Ichikawa (JP); Hiroko Kuno, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 520 days.

(21) Appl. No.: 10/482,296

(22) PCT Filed: Jul. 1, 2003

(86) PCT No.: PCT/JP03/08359

§ 371 (c)(1),
(2), (4) Date: Jan. 16, 2004

(87) PCT Pub. No.: WO2004/002894

PCT Pub. Date: Jan. 8, 2004

(65) Prior Publication Data

US 2005/0163999 A1  Jul. 28, 2005

(30) Foreign Application Priority Data

Jul. 1, 2002 (JP) .............................. 2002-192622
Jun. 26, 2003 (JP) .............................. 2003-182524

(51) Int. Cl.
*B32B 5/16* (2006.01)
*B32B 9/04* (2006.01)

(52) U.S. Cl. ........................ 428/328; 359/350; 428/701

(58) Field of Classification Search ................ 428/323, 428/328, 432, 701; 359/350
See application file for complete search history.

(56) References Cited

U.S. PATENT DOCUMENTS

| 4,583,815 | A | * | 4/1986 | Taga et al. .................. 219/203 |
| 5,236,737 | A | * | 8/1993 | Linton ..................... 427/126.3 |
| 5,484,694 | A | * | 1/1996 | Lelental et al. ............. 430/530 |
| 5,569,413 | A | * | 10/1996 | Jacobson ................. 252/520.1 |

(Continued)

FOREIGN PATENT DOCUMENTS

JP    A 4-62713    2/1992

(Continued)

*Primary Examiner*—H. Thi Le
(74) *Attorney, Agent, or Firm*—Oliff & Berridge PLC

(57) ABSTRACT

Physical characteristics of ATO fine particles capable of exhibiting such optical properties as a high visible light transmittance, a low solar radiation transmittance, and a low haze value when the ATO fine particles are formed on a transparent substrate or in the substrate are clarified, and the ATO fine particles having the physical characteristics thereof are manufactured. The ATO fine particles having such physical characteristics that a size of a crystallite constituting the ATO fine particles is 4 to 125 nm, and that a specific surface area of the fine particles of 5 to 110 $m^2/g$ can exhibit the above-described optical properties, and an example of a method for manufacturing thereof is to parallel-drop an antimony chloride alcoholic solution and an ammonium hydrogen carbonate aqueous solution in a tin chloride aqueous solution, thoroughly wash generated precipitates, dry and calcinate them in an atmosphere, thereby the ATO fine particles are manufactured.

10 Claims, 2 Drawing Sheets

U.S. PATENT DOCUMENTS 5,575,957 A * 11/1996 Okuda et al. ............. 252/520.1
5,788,887 A * 8/1998 Swanson ................. 252/520.1
6,218,018 B1 * 4/2001 McKown et al. ........... 428/432

FOREIGN PATENT DOCUMENTS

| JP | A 4-79104 | 3/1992 |
| JP | A 5-246710 | 9/1993 |
| JP | A 6-183708 | 7/1994 |
| JP | A 6-232586 | 8/1994 |
| JP | A 8-127860 | 5/1996 |
| JP | A 8-319118 | 12/1996 |
| JP | A 9-12314 | 1/1997 |
| JP | A 10-101375 | 4/1998 |
| JP | B2 2844011 | 10/1998 |
| JP | A 11-278826 | 10/1999 |

* cited by examiner

FIG.1

| ATO SAMPLE | CRYSTALLITE SIZE (nm) | SPECIFIC SURFACE AREA (m2/g) | DISPERSED PARTICLE SIZE (nm) | COLOR OF PARTICLE L*a*b* | | | SOLAR SHIELDING SOLID SAMPLE | VISIBLE LIGHT TRANSMITTANCE 75% STANDARDIZATION | |
|---|---|---|---|---|---|---|---|---|---|
| | | | | L* | a* | b* | | SOLAR RADIATION TRANSMITTANCE (%) | HAZE (%) |
| SAMPLE a | 4.73 | 82.1 | 125.2 | 50.8493 | −2.4346 | −5.7428 | FILM A | 59.5 | 0.87 |
| SAMPLE b | 5.30 | 82.9 | 72.6 | 51.3162 | −2.4705 | −6.6331 | FILM B | 57.5 | 0.78 |
| SAMPLE c | 6.16 | 57.7 | 56.1 | 50.3373 | −2.7041 | −6.0424 | FILM C | 56.0 | 0.79 |
| SAMPLE d | 7.25 | 43.7 | 75.9 | 50.3621 | −3.0768 | −4.7565 | FILM D | 55.0 | 0.70 |
| SAMPLE e | 9.08 | 30.4 | 61.4 | 51.8284 | −3.4086 | −3.6046 | FILM E | 56.4 | 0.80 |
| SAMPLE f | 13.29 | 11.9 | 59.7 | 53.7770 | −3.5380 | −3.8320 | FILM F | 58.0 | 0.91 |
| SAMPLE g | 90.26 | 8.9 | 113.2 | 58.5496 | −3.9763 | −3.5330 | FILM G | 59.8 | 0.98 |
| SAMPLE h | 3.81 | 118.9 | 131.4 | 57.1253 | −2.6472 | −2.5241 | FILM H | 62.5 | 0.75 |
| SAMPLE i | 130.28 | 1.0 | 123.6 | 59.9362 | −2.8861 | −9.0257 | FILM I | 66.4 | 2.50 |
| SAMPLE j | 3.91 | 88.6 | 125.9 | 57.6002 | −2.6905 | −3.4125 | FILM J | 60.1 | 0.85 |
| SAMPLE k | 4.09 | 105.0 | 128.1 | 53.6830 | −2.4859 | −4.1309 | FILM K | 59.6 | 0.82 |
| SAMPLE l | 50.60 | 66.4 | 59.2 | 58.7884 | −3.6483 | −8.9268 | FILM L | 55.3 | 0.70 |
| SAMPLE m | 6.80 | 53.8 | 52.4 | 54.8021 | −3.2149 | −7.6125 | FILM M | 55.5 | 0.80 |
| SAMPLE n | 6.03 | 59.3 | 57.0 | 50.6677 | −2.8389 | −7.5336 | FILM N | 58.0 | 0.70 |
| SAMPLE o | 5.50 | 65.0 | 58.1 | 53.5518 | −3.2615 | −5.7084 | FILM O | 57.5 | 0.80 |

ANTIMONY TIN OXIDE FINE PARTICLES FOR SUNLIGHT SHIELDING, AND DISPERSE LIQUID FOR FORMATION OF SUNLIGHT SHIELDING SOLID, SUNLIGHT SHIELDING SOLID, AND TRANSPARENT SUBSTRATE FOR SUNLIGHT SHIELDING USING THEREOF

TECHNICAL FIELD

The present invention relates to a sunlight shielding solid by being formed on transparent substrates which require a sunlight shielding function such as glass, plastic, or the like having the sunlight shielding function used for a window of a vehicle, a building, an office, a general residence, or the like, a telephone booth, a display window, a lamp for illumination, a transparent case, and so forth, or by being incorporated therein, a disperse liquid for formation of a sunlight shielding solid for forming the sunlight shielding solid, and antimony tin oxide fine particles as a raw material thereof.

BACKGROUND ART

Conventionally, as a method for removing and reducing a thermal ingredient from light of an external light source such as sunlight, a beam of a bulb, or the like, a film containing a material for reflecting an infrared ray which greatly contributes to a thermal effect is formed as a heat wave reflecting transparent substrate on a surface of a transparent substrate such as glass or the like, and the heat wave reflecting transparent substrate is used. A metal oxide such as FeOx, CoOx, CrOx, TiOx, and the like, or a metallic material containing a large amount of free electrons such as Ag, Au, Cu, Ni, Al, and the like is used as the aforementioned material.

However, the aforementioned material has such properties to reflect or absorb not only the infrared ray which greatly contributes to the thermal effect but also a visual light at the same time, and therefore, there is a problem about lowering a visible light transmittance. However, since the transparent substrate such as glass or the like used for a window material such as a building material, a vehicle, a telephone booth, or the like requires a high transmittance in a visible light region, a film thickness thereof needs to be extremely thin when the aforementioned material is used. Accordingly, when the aforementioned material is formed on the transparent substrate, generally, a film having a thickness of as thin as approximately 10 nm is formed by physical film-formation methods such as spray baking, a CVD method, a sputtering method, a vacuum deposition method, and the like.

However, these film formation-methods require a huge apparatus or a vacuum equipment, and there is a problem of productivity or area enlargement, and a disadvantage of high manufacturing costs of the film. Furthermore, when a sunlight shielding characteristic (a characteristic for shielding a light having a wavelength band of 300 to 2100 nm) of the aforementioned material becomes high, reflectivity of the visual light region tends to be high at the same time, resulting in disfigurement caused by a glaring appearance like a mirror.

In order to improve the aforementioned problems, a sunlight shielding solid which exhibits the high visible transmittance and a high sunlight shielding rate is required to be formed on the transparent substrate or in the substrate. Furthermore, properties such as little haze of the film or the like are required for the sunlight shielding solid used for, for example, the window material or the like in addition to the aforementioned optical characteristics and electrical characteristics. The haze of the film is evaluated by a numerical value called a haze value. The haze value is defined as a ratio of a diffuse transmission light to a total transmittance, and the sunlight shielding solid looks hazy to human eyes when the value is high. Accordingly, the window material or the like requiring for transparency is desired to have the low haze value of less than 1%.

Here, an antimony tin oxide (hereinafter abbreviated as ATO) is known as one of the materials having a visible light transmittance function and a sunlight shielding function. However, physical characteristics of the ATO which exhibits the excellent visible light transmittance function and sunlight shielding function have never been studied, and for example, each of the ATO described in Patent Document 1, Patent Document 2, Patent Document 3, and Patent Document 4 relates to conductivity.

(Patent Document 1) Japanese Patent No.2844011
(Patent Document 2) Japanese Patent Laid-open No. Hei 11-278826
(Patent Document 3) Japanese Patent Laid-open No. Hei 6-183708
(Patent Document 4) Japanese Patent Laid-open No. Hei 5-246710

Here, the present invention clarifies the physical characteristics of the ATO capable of forming the sunlight shielding solid having such optical properties as the high visible light transmittance, a low solar radiation transmittance, and simultaneously the low haze value when the ATO is formed on the transparent substrate or incorporated in the substrate so as to be formed as a board shape, a sheet shape, a film shape or the like; furthermore, an object of the present invention is to provide ATO fine particles having the physical characteristics thereof, a disperse liquid for formation of a sunlight shielding solid which can form the sunlight shielding solid by a simple coating method or incorporating method, and the sunlight shielding solid containing the ATO which has the physical characteristics thereof.

DISCLOSURE OF THE INVENTION

In order to achieve the aforementioned object, inventors of the present invention considered requirements of ATO capable of forming a sunlight shielding solid having such optical properties as a high visible light transmittance, a low solar radiation transmittance, and simultaneously a low haze value when the ATO is formed on a transparent substrate or incorporated in the substrate so as to be formed as a board shape, a sheet shape, a film shape or the like.

First, ATO fine particles contained in the sunlight shielding solid mutually interact with incident visual light or infrared light by intervening in an interference effect on incident light, an absorption/radiation effect of light caused by an electronic state of powder particles or the like, and cause optical phenomena such as transmission, absorption, reflection, and the like. Furthermore, fine particles of compound oxide such as the ATO fine particles can be prepared in a fine particle having various physical characteristics in a surface state or an electronic state of the fine particles according to manufacturing conditions thereof. Based on the above-mentioned ideas, the inventors of the present invention conducted a research on a relationship between the ATO fine particles having the various physical characteristics and a sunlight shielding function.

As a result, the inventors found phenomena that, when physical characteristics that the ATO fine particles had crystallite sizes in a specific range and specific surface areas in a specific range are satisfied, the sunlight shielding solid containing the ATO fine particles would have a maximum transmittance in a visible light region and would have a minimum transmittance by exhibiting strong plasma absorption in a near-infrared region which is close to the visible light region, and a haze value would be extremely low; therefore, the inventors completed the present invention.

In other words, a first invention of the present invention is antimony tin oxide fine particles for sunlight shielding, wherein a size of a crystallite constituting the fine particles is 4 to 125 nm, and a specific surface area of the fine particles is 5 to 110 $m^2/g$.

The antimony tin oxide fine particles for sunlight shielding are formed on a transparent substrate or in the substrate by an appropriate method so that a sunlight shielding solid having such optical properties as a high visible light transmittance, a low solar radiation transmittance, and simultaneously a low haze value can be formed.

A second invention is the antimony tin oxide fine particles for sunlight shielding according to the first invention, in the antimony tin oxide fine particles for sunlight shielding according to claim 1, L* is 45 to 65, a* is −5 to −1, and b* is −11 to −1 in a color of powders containing the antimony tin oxide fine particles according to an L* a* b* color specification system.

The antimony tin oxide fine particles for sunlight shielding having the color of particles thereof are formed on the transparent substrate or in the substrate by an appropriate method so that a sunlight shielding solid having such optical properties as a high visible light transmittance, a low solar radiation transmittance, and simultaneously a low haze value can be formed.

A third invention is a disperse liquid for formation of a sunlight shielding solid, the antimony tin oxide fine particles for sunlight shielding according to the first invention or the second invention being dispersed in a solvent, wherein a dispersed particle size of the antimony tin oxide fine particles for sunlight shielding in the solvent is 130 nm or less.

The disperse liquid for formation of the sunlight shielding solid is coated on a transparent substrate or incorporated in the substrate by an appropriate method so that a sunlight shielding solid having such optical properties as a high visible light transmittance, a low solar radiation transmittance, and simultaneously a low haze value can be formed.

A fourth invention is the disperse liquid for formation of the sunlight shielding solid according to the third invention, in the disperse liquid for formation of the sunlight shielding solid according to claim 3, an inorganic binder and/or a resin binder is/are contained as a binder.

By adding the inorganic binder and/or the resin binder, adhesiveness to the transparent substrate of the ATO fine particles according to the present invention is improved, and hardness of the sunlight shielding solid is further improved.

A fifth invention is a sunlight shielding solid, wherein the sunlight shielding solid is formed by using the disperse liquid for formation of the sunlight shielding solid according to the third invention or the fourth invention.

The sunlight shielding solid has such excellent optical properties as a high visible light transmittance, a low solar radiation transmittance, and simultaneously a low haze value.

A sixth invention is the sunlight shielding solid, in the sunlight shielding solid according to the fifth invention, a film of a silicon oxide, a zirconium oxide, a titanium oxide, or an aluminum oxide is formed on the sunlight shielding solid.

The film of the silicon oxide, the zirconium oxide, the titanium oxide, or the aluminum oxide is formed on the sunlight shielding solid so that bonding force to the transparent substrate of the sunlight shielding solid is improved, and hardness and weather resistance of the sunlight shielding solid are further improved.

A seventh invention is the sunlight shielding solid according to the fifth invention or the sixth invention, in the sunlight shielding solid according to claim 5 or claim 6, a solar radiation transmittance in a wavelength band of 300 to 2100 nm is less than 60% and a haze value is less than 1% when a visual light transmittance is 70% or more.

The sunlight shielding solid becomes the sunlight shielding solid exhibiting practically a sufficient transparency and a sunlight shielding effect when the visual light transmittance is 70% or more, when the solar radiation transmittance in a wavelength band of 300 to 2100 nm is less than 60%, and when the haze value is less than 1%.

An eighth invention is a transparent substrate for sunlight shielding, wherein the sunlight shielding solid according to any one of the fifth invention to the seventh invention is formed.

The transparent substrate for sunlight shielding exhibits practically a sufficient transparency and a sunlight shielding effect; therefore, it can be appropriately applied to a window or the like of a vehicle, a building, an office, a general residence, or the like.

BRIEF DESCRIPTION OF DRAWINGS

FIG. 1 is a list about optical characteristics of a crystallite size, a specific surface area, a dispersed particle size, a color of particles, and a sunlight shielding solid sample of ATO samples.

BEST MODE FOR CARRYING OUT THE INVENTION

Figure 2:
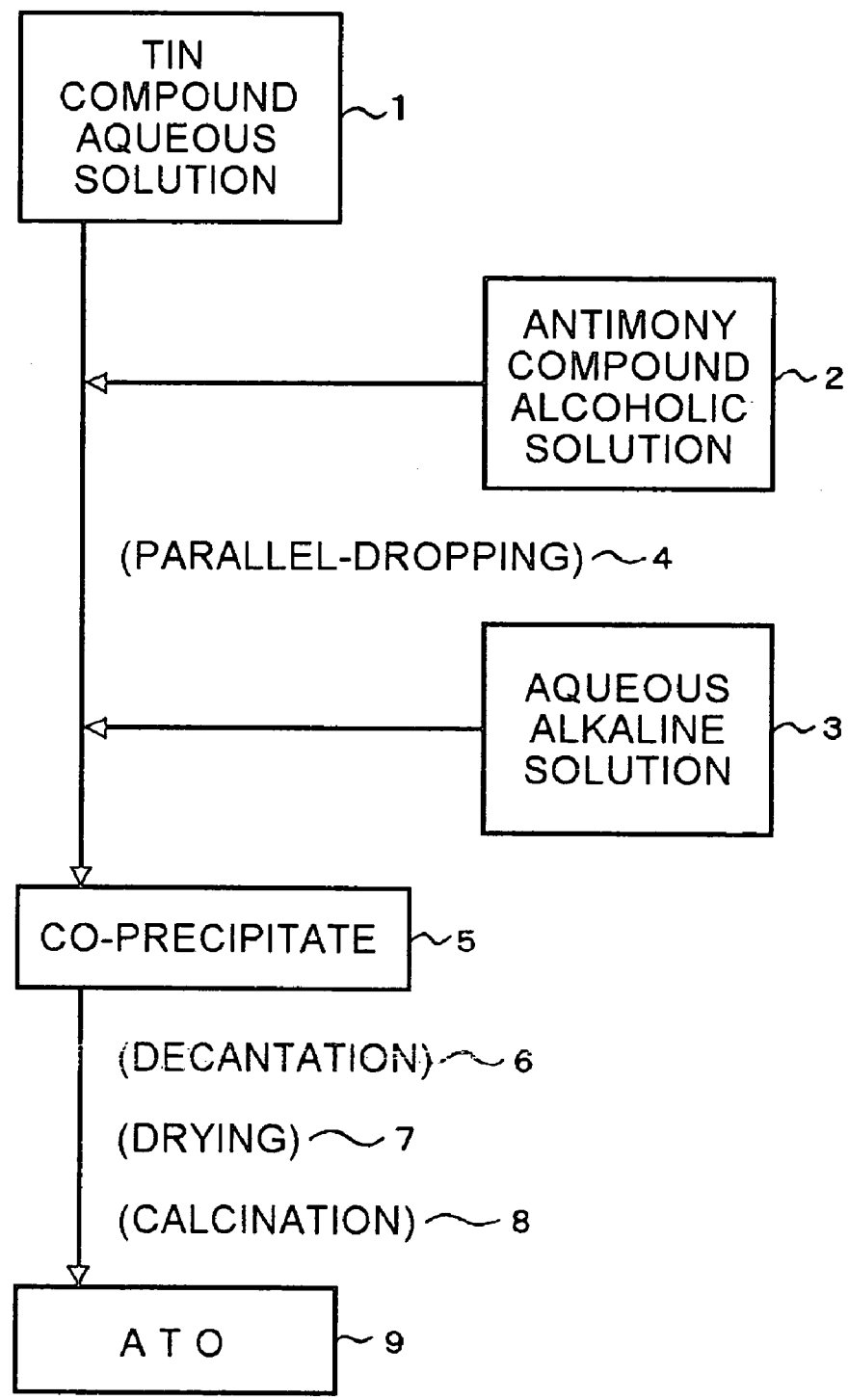
FIG. 2 is an example of a manufacturing flow of the ATO samples.

An embodiment of the present invention will be explained in detail hereinafter.

First, the inventors of the present invention considered a mechanism at the level of crystals of ATO fine particles which exhibit a sunlight shielding effect, and made a study of a concrete method for realizing the preferred sunlight shielding effect based on the mechanism, and therefore, an overview thereof will be explained.

It is known that a certain substance has a specific plasma frequency in a mutual interaction between a general light and an electron in the substance, that a light having a longer wavelength than the frequency is reflected, and that a light having a shorter wavelength than that is transmitted. A plasma frequency "$\omega_p$" is expressed by a formula (1).

$$\omega_p^2 = nq^2/\epsilon m \quad (1)$$

Here, an "n" means a conduction electron density, a "q" an electric charge of an electron, an "$\epsilon$" a permittivity, and an "m" an effective mass of the electron. Generally, when the conduction electron density increases, the plasma frequency will become large, and therefore, even a light of a shorter wavelength side will be reflected. The conduction electron density of a metal is at the level of $10^{22}/cm^3$, and that of ATO is at the level of $10^{20}/cm^3$, and therefore, the metal has high reflectivity already from a visible light region; however, though the ATO transmits a visible light, it has high reflectivity beginning from a near-infrared region, thereby the ATO is used as a sunlight shielding solid.

Here, the inventors of the present invention thought it may be possible to control the conduction electron density "n" and the permittivity "$\epsilon$" in the formula (1) and to set up the plasma frequency "$\omega_p$" which the ATO fine particles contain to a desired range by controlling a crystallite size and a specific surface area of the ATO fine particles. Furthermore, when the inventors consider an effect of the specific surface area of the ATO fine particles affecting to a sunlight shielding function, a total shielding area "A" of a certain weight "M" of the ATO is expressed as a formula (2), considering a particle radius of the ATO fine particles as an "r", and a gravity as a "$\rho$".

$$A = \pi r^2 \times M/\rho/(4\pi r^3/3) \qquad (2)$$

The formula (2) tells that the specific surface area increases if a particle radius is generally small; therefore, the smaller the particle radius "r" is, which means the larger the specific surface area is, the larger the total shielding area "A" is. However, when the particle radius "r" is too small, a sunlight shielding function is lowered due to change of an electron density of a particle; therefore, existence of an optimum range of the particle radius "r", which means the specific surface area to the sunlight shielding function is inferred.

On the other hand, regarding an effect of the crystallite size of the ATO fine particles on the sunlight shielding function, in the case of the ATO fine particles according to the present invention, the larger the specific surface area is, the smaller the crystallite size is, and there is a negative correlation between the specific surface area and the crystallite size. Although details are unknown, it is inferred that the crystallite size has an effect on the sunlight shielding function as well as the specific surface area, and that an optimum range of the crystallite size to the sunlight shielding function exists.

Based on the aforementioned consideration and results of the study, the ATO having the various crystallite sizes and specific surface areas is manufactured and optical characteristics thereof are measured.

As a result, it turns out that the crystallite size of the ATO fine particles will be 4 to 125 nm, preferably 5 to 80 nm, and more preferably 6 to 60 nm, and that the specific surface area of the ATO fine particles will be 5 to 110 $m^2/g$, preferably 10 to 90 $m^2/g$, and more preferably 20 to 70 $m^2/g$ Furthermore, it turns out that a sunlight shielding solid formed by using a disperse liquid having a dispersed particle size of 130 nm or less when the ATO fine particles are dispersed in a solvent will exhibit desirable optical characteristics. In other words, it is thought, when the ATO fine particles have the crystallite size and the specific surface area of this range, and when the dispersed particle size in the solvent is 130 nm or less, that the sunlight shielding solid formed by the disperse liquid containing the ATO exhibits such excellent effects that it has a high transmittance in the visible light region and shows a low solar radiation transmittance by exhibiting strong plasma absorption in the near-infrared region near the visible light region, and that a haze value is extremely low.

Furthermore, in order to obtain the sunlight shielding solid which has excellent optical properties according to the present invention, it is found to be desirable if powders containing the ATO fine particles having the aforementioned powder properties satisfy such conditions that L* is 45 to 65, a* −5 to −1, and b* −11 to −1 according to an L*a*b* color specification system recommended by Commission Internationale de l'Eclairage (CIE).

There are various kinds of methods for manufacturing ATO samples according to the present invention such as a method for parallel-dropping an antimony compound alcoholic solution and an aqueous alkaline solution in a tin compound aqueous solution, a method for drying and sintering generated precipitates after adding approximately 1.1 times of a theoretical amount of water required for hydrolysis of these compounds and acid of nitric acid, hydrochloric acid, and the like to an n-butanol solution containing Sn$(OC_4H_9)_4$ and Sb$(OC_4H_9)_3$ and hydrolyzing Sn$(OC_4H_9)_4$ and Sb$(OC_4H_9)_3$, or the like. Here, the aforementioned method for parallel-dropping the antimony compound alcoholic solution and the aqueous alkaline solution in the tin compound aqueous solution will be explained hereinafter with reference to FIG. 2 showing a manufacturing flow.

A tin compound aqueous solution 1 is prepared by dissolving tin chloride in pure water at a temperature of the solution is 50° C. or less. An antimony compound alcoholic solution 2 is prepared by dissolving antimony chloride in alcohol, and an aqueous alkaline solution 3 used as a precipitant is prepared. Here, various kinds of alcohols such as methanol, ethanol, or the like are applicable as the alcohol. An aqueous solution of ammonium hydrogen carbonate, aqueous ammonia, sodium hydroxide, potassium hydroxide, or the like is applicable as the aqueous alkaline solution 3, and especially ammonium hydrogen carbonate and aqueous ammonia are preferable.

After completing preparation of the respective solutions, the antimony compound alcoholic solution 2 and the aqueous alkaline solution 3 are parallel-dropped 4 in the tin compound aqueous solution 1. At this time, an amount of dropping the antimony compound alcoholic solution 2 is preferably dropped so that an amount of antimony is 1 to 20 wt % to tin in terms of the element in question. An amount of dropping the aqueous alkaline solution 3 should be a necessary chemical equivalent or more so that the tin chloride and the antimony chloride can be converted to hydroxides, and more preferably within a range of an equivalent weight to an amount of 1.5 times thereof.

A time for parallel-dropping the antimony compound alcoholic solution 2 and the aqueous alkaline solution 3 is within 60 minutes from a view of productivity, and preferably within 30 minutes. After completing parallel-dropping, the aqueous solution continues to be stirred so as to be uniformized, and a temperature of the aqueous solution at this time is the same temperature as the temperature during the parallel-dropping, and preferably 50° C. or less. A period of time for stirring is not specially limited, however, it is 30 minutes or less from a view of productivity, and preferably 15 minutes or less.

Co-precipitates are generated 5 by the parallel-dropping 4, and the co-precipitates are collected and thoroughly washed by repeating decantation 6, especially residual chloride ions being 0.15 wt % or less, and are dried 7. Here, if the residual chloride ions as impurities are 0.15 wt % or less, the desired optical characteristics can be obtained without inhibiting solidification of the antimony in a next calcination process. Incidentally, a drying temperature or time is not limited.

The co-precipitates after drying are calcinated 8 at 500° C. to 1000° C. for 30 minutes to 5 hours in an atmosphere to manufacture ATO 9. During the calcination, the crystallite size or the specific surface area of the ATO fine particles can be controlled by controlling a calcinating temperature and a calcinating time. The crystallite size is larger as the calcinating temperature is higher and as the calcinating time is longer, and the specific surface area is smaller as the calcinating temperature is higher; however, the ATO fine particles having the preferable crystallite size and specific surface area can be obtained under the calcinating temperature at 500° C. to less than 1100° C. and the calcinating time at 30 minutes to 5 hours. The ATO fine particles are formed on the sunlight shielding solid or incorporated in the sunlight shielding solid by an appropriate method so as to be formed as a board shape, a sheet shape, a film shape, or the like so that the sunlight shielding solid having such optical properties as a high visible light transmittance, a low solar radiation transmittance, and simultaneously a low haze value can be formed.

A disperse liquid for formation of a sunlight shielding solid according to the present invention is prepared by dispersing the ATO fine particles in a solvent. The dispersed particle size thereof is preferably 130 nm or less. When the dispersed particle size becomes large by exceeding 130 nm, the desired optical properties cannot be obtained. Especially, many aggregated coarse particles serve as a light scattering source to increase haze, and are a cause of decreasing the visible light transmittance, which is not preferable. Here, the dispersed particle size means an aggregated particle size of the ATO fine particles in the solvent, and can be measured by various commercially available particle size distribution analyzers. For example, the disperse liquid in which the ATO fine particles are dispersed in the solvent can be taken as a sample, and measured by ESL-800 manufactured by Otsuka Electronics Co., Ltd., a dynamic light scattering method being employed as a principle.

The solvent is not specifically limited, and may be appropriately selected according to coating or kneading conditions, or coating or kneading environments. Furthermore, when an inorganic binder and/or a resin binder to be described later is/are contained in the disperse liquid for formation of the sunlight shielding solid, the solvent may be appropriately selected according to a binder. For example, various kinds of organic solvents such as water, alcohols such as ethanol, propanol, butanol, isopropyl alcohol, isobutyl alcohol, diacetone alcohol, and the like, ethers such as methyl ether, ethyl ether, propyl ether, and the like, esters, ketones such as acetone, methyl ethyl ketone, diethyl ketone, cyclohexanone, isobutyl ketone, and the like are usable, and acid or alkali may be added to control pH as necessary. Furthermore, in order to further improve dispersion stability of the ATO fine particles in the disperse liquid and to avoid aggregate coarseness, addition of various kinds of surfactants, coupling agents, or the like is preferable. The disperse liquid for formation of the sunlight shielding solid is formed on a transparent substrate or incorporated in the substrate by an appropriate method so that a sunlight shielding solid film having such optical properties as a high visible light transmittance, a low solar radiation transmittance, and simultaneously a low haze value can be formed.

Kinds of the inorganic binders or the resin binders to be contained in the disperse liquid for formation of the sunlight shielding solid are not specially limited; however, a metallic alkoxide such as silicon, zirconium, titanium, or aluminum, or a partially hydrolytic condensation copolymer thereof, or organosilazane can be applied as the inorganic binder, and a thermoplastic resin such as an acrylic resin, a thermosetting resin such as an epoxy resin, and the like can be applied as the resin binder.

A method for dispersing the ATO fine particles or the binder is not limited as long as it is a method for uniformly dispersing thereof without aggregating in the disperse liquid, and for example, a method using an apparatus such as a bead mill, a ball mill, a sand mill, a paint shaker, an ultrasonic homogenizer, and the like can be preferably applied.

When a film is formed on the transparent substrate by using the prepared disperse liquid, conductivity of the sunlight shielding solid is performed along a conduction path passing through connecting places of the ATO fine particles. Therefore, for example, adjustment of an amount of the surfactants or the coupling agents makes it possible to partially cut the conduction path and to control a surface resistance value of the sunlight shielding solid as $10^6$ Ω/□ or more. By controlling the surface resistance value as approximately $10^6$ Ω/□ or more, reflection of the sunlight shielding solid to an electric wave can be restrained, and for example, such problems that the electric wave of a cellular phone, a television set, a radio, or the like is reflected to be unable to receive, that the electric wave is interfered, or the like can be avoided in and out of a building where the transparent substrate in which the sunlight shielding solid is formed is installed.

As another method for controlling the conductivity, it is possible to employ a method for adding the inorganic binder or the resin binder to the disperse liquid for formation of the sunlight shielding solid and adjusting the amount thereof. The method for adding the inorganic binder or the resin binder is preferable because adhesiveness to the substrate of the ATO fine particles deposited and formed of high density on the substrate is improved after curing the disperse liquid, and because there is an effect that hardness of a film is improved. On the other hand, a film obtained by not adding the resin binder or the inorganic binder in the disperse liquid has a film structure with which only the ATO fine particles are deposited on the substrate. The film on which only the ATO fine particles are deposited certainly shows a sunlight shielding effect as it is. Regardless of whether the binder is added or not, the sunlight shielding solid has such excellent optical properties as a high visible light transmittance, a low solar radiation transmittance, and simultaneously a low haze value.

Furthermore, on the sunlight shielding solid thus obtained, a film composed of a metallic alkoxide such as silicon, zirconium, titanium, or aluminum, or a partially hydrolytic condensation copolymer thereof is deposited as a second layer, and an oxide film of silicon, zirconium, titanium, or aluminum is formed so that bonding force of the sunlight shielding solid having the ATO fine particles as a main ingredient to the substrate, hardness of the film, or weather resistance of the sunlight shielding solid can be further improved.

Especially, to the aforementioned sunlight shielding solid on which only the ATO fine particles are deposited, it is preferable to further coat a coating liquid containing the inorganic binder and/or the resin binder such as the metallic alkoxide of silicon, zirconium, titanium, or aluminum, or the partially hydrolytic condensation copolymer thereof and to form the film so as to be a multilayer film. With this film structure, since disperse liquid ingredients are formed by filling interstices of a first layer where the ATO fine particles are deposited, a haze value of the sunlight shielding solid is further decreased and a visible light transmittance increases, and furthermore, bonding of the particles to the substrate is improved.

As a method for bonding the film composed of the metallic alkoxide of silicon, zirconium, titanium, or aluminum, or the partially hydrolytic condensation copolymer thereof on the film composed of the ATO fine particles alone or the ATO fine particles as a main ingredient, a coating method is effective from a view of easiness of a formation process or costs. A coating liquid used for the coating method contains one kind, two kinds or more of the metallic alkoxide of silicon, zirconium, titanium, or aluminum, or the partially hydrolytic condensation copolymer thereof in water or alcohol, and the amount thereof is preferably 40 wt % or less of a total solution in terms of the obtained oxide in question after heating. It is also possible to control pH by adding acid or alkali as necessary. By coating such a disperse liquid on the sunlight shielding solid of the ATO fine particles being the main ingredient as the second layer and further heating it, an oxide film of such as silicon, zirconium, titanium, aluminum, or the like can be easily manufactured. In addition to the above, an organosilazane solution may be used as a binder ingredient used for the disperse liquid of the present invention or a coating liquid for overcoating.

A method for coating the disperse liquid for formation of the sunlight shielding solid according to the present invention and the coating liquid for overcoating to the substrate is not limited. Any method is acceptable as long as it is a method for coating the disperse liquid evenly, thinly, and uniformly such as, for example, a spin-coat method, a bar coat method, a spray coat method, a dip-coat method, a screen printing method, a roll-coat method, a flow coat, and the like. When the disperse liquid is incorporated into, for example, the resin as the substrate, a generally known method may be appropriately selected as long as it is a method for uniformly dispersing the ATO fine particles in the resin. Furthermore, the resin in which the ATO fine particles are dispersed can be pelletized and formed to be various shapes by a generally known process after melt-mixing at the temperature near a melting point of the resin. For example, a PET resin, an acrylic resin, a polyamide resin, a vinyl chloride resin, a polycarbonate resin, an olefin resin, an epoxy resin, a polyimide resin, a fluorocarbon resin, and the like are listed as the resin.

When the disperse liquid for formation of the sunlight shielding solid or the coating liquid for overcoating contains the metallic alkoxide of silicon, zirconium, titanium, or aluminum, and a hydrolyzed polymer thereof, a heating temperature of the substrate after coating the disperse liquid is preferably 100° C. or above, and more preferably, a boiling point or more of the solvent in the disperse liquid. Heating of 100° C. or more completely completes polymerization reaction of alkoxide contained in a coating film or the hydrolyzed polymer thereof; furthermore, it helps to avoid a problem that a water or an organic solvent contained in the disperse liquid remains in the sunlight shielding solid, and causes lowering of the visual light transmittance of the sunlight shielding solid after heating.

When the disperse liquid for formation of the sunlight shielding solid or the coating liquid for overcoating contains the resin binder, it may be cured according to respective curing methods. For example, an ultraviolet curing resin may be appropriately cured by irradiating with an ultraviolet ray, and a room temperature curing resin may be left as it is after coating. Therefore, coating to an existing front glass or the like at a job site is possible.

Since the ATO fine particles are dispersed in the sunlight shielding solid according to the present invention, reflection in the visual light region is little, and it is possible to avoid a glistening appearance compared with a film having a mirror-type surface composed of crystals densely buried in the film such as a thin oxide film manufactured by a physical film-formation method. On the other hand, the ATO in the sunlight shielding solid has a plasma frequency from visual to the near-infrared region as described above, and therefore, plasma reflection accompanied thereby is large in the near-infrared region.

Furthermore, when reflection of the sunlight shielding solid according to the present invention in the visible light region needs to be further restrained, a film having a low refractive index such as $SiO_2$ or $MgF_2$ is formed on the film in which the ATO fine particles constituting the sunlight shielding solid according to the present invention is dispersed, or on surfaces of the ATO fine particles, thereby a multilayer film having luminous reflectance of 1% or less can be easily obtained.

In addition to the above, when an ultraviolet shielding function is added to the sunlight shielding solid according to the present invention, fine particles such as inorganic titanium oxide, zinc oxide, cerium oxide, and the like, or one kind, two kinds or more of organic benzophenone, benzotriazole, and the like may be added to the disperse liquid.

Since the disperse liquid for formation of the sunlight shielding solid according to the present invention does not utilize decomposition or chemical reaction of coating ingredients by heat during the calcination so as to form the sunlight shielding solid of an object, the sunlight shielding solid having stable characteristics and uniform film thickness can be formed.

As described above in detail, by using the ATO fine particles according to the present invention, manufacture of the sunlight shielding solid having the preferred optical properties becomes possible. The ATO fine particles are inorganic materials and have extremely high weather resistance compared with organic materials, and color or various functions are rarely deteriorated when the ATO fine particles are used for a portion exposed to, for example, a solar beam (an ultraviolet ray).

The sunlight shielding solid according to the present invention formed as above realizes the sunlight shielding solid exhibiting such optical properties that a solar radiation transmittance to an infrared light having a wavelength band of 300 to 2100 nm is less than 60%, and that a haze value is less than 1% when a visual light transmittance is 70% or more. The sunlight shielding solid exhibiting the optical characteristics exhibits practically a sufficient transparency and a sunlight shielding effect, and a transparent substrate for sunlight shielding in which the sunlight shielding solid is formed exhibits practically a sufficient transparency and a sunlight shielding effect; therefore, a window or the like of a vehicle, a building, an office, a general residence, or the like can be appropriately applied.

EXAMPLE

1) Preparation of ATO (samples a to o)

First, a tin chloride aqueous solution having tin chloride concentration of 0.030 g/ml and a liquid temperature at 25° C., an antimony chloride methanol solution having antimony chloride concentration of 0.034 g/ml, and an ammonium hydrogen carbonate aqueous solution having ammonium hydrogen carbonate concentration of 0.176 g/ml are prepared. Next, 150 ml of the antimony chloride methanol solution and 334 ml of the ammonium hydrogen carbonate aqueous solution are parallel-dropped in 1500 ml of the tin chloride aqueous solution. A dropping time is 30 minutes, and stirring is continued for 10 more minutes after completing parallel-dropping while keeping the liquid temperature at 25° C. Obtained precipitates are dried after thoroughly washed by repeating decantation, and ATO samples a to o shown in FIG. 1 are prepared by calcinating in an atmosphere.

Calcination conditions are as follows: 500° C. for 1 hour as for the sample a, 500° C. for 2 hours as for the sample b, 600° C. for 1 hour as for the sample c, 700° for 1 hour as for the sample d, 800° for 1 hour as for the sample e, 900° C. for 1 hour as for the sample f, 1000° C. for 30 minutes as for the sample g, 400° C. for 1 hour as for the sample h, 1100° C. for 1 hour as for the sample i, 400° C. for 2 hours as for the sample j, 500° C. for 30 minutes as for the sample k, 500° C. for 2 hours as for the sample 1, 700° C. for 1 hour as for the sample m, 700° C. for 1 hour as for the sample n, and 700° C. for 1 hour as for the sample o. It should be noted that amounts of antimony in the samples are as follows: 10 wt % as for the samples a to k, 8 wt % as for the sample 1, 5.7 wt % as for the sample m, 7.5 wt % as for the sample n, and 8.7 wt % as for the sample o, and that the obtained ATO samples are almost dark blue.

2) Measurement of Physical Characteristics

Regarding measurement of the physical characteristics of the prepared ATO samples a to o, the crystallite sizes thereof are measured by a Scherrer method whose peak of $SnO_2$ (101) is used, the specific surface areas thereof are measured by a nitrogen absorption method using an apparatus manufactured by Carlo Erba, and colors of particles (light source for sight D65, field of view 10°) are measured using a spectrophotometer U-4000 manufactured by Hitachi Ltd. Measurement results are shown in FIG. 1.

3) Preparation of the Disperse Liquid for Formation of the Sunlight Shielding Solid 20 wt % of the prepared respective ATO samples a to o, 70 wt % of toluene, 10 wt % of a dispersing agent, and 0.3 mm of zirconia beads equivalent to 63% of a filling factor are put into a container to conduct dispersing processing for 12 hours with a paint shaker. Next, 77.7 wt % of the disperse liquid and 22.3 wt % of an acrylic UV curing resin (a solid content 70%) as a binder are added to obtain the disperse liquid for formation of the sunlight shielding solid.

4) Formation of Sunlight Shielding Solid

The disperse liquid for formation of the sunlight shielding liquid is coated on PET films having a thickness of 50 µm by a bar-coater method. When coating, three kinds of bars having counts of 60, 24, and 6 are used, and the films having three kinds of film thickness are coated. The coated films are dried at 80° C. for 30 seconds and irradiated with an ultraviolet light to obtain sunlight shielding solid samples A to O.

5) Measurement of Optical Properties

The optical properties of the obtained sunlight shielding solid samples A to O are measured using the spectrophotometer U-4000 manufactured by Hitachi Ltd. Also, the haze values are measured using HR-200 manufactured by Murakami Color Research Laboratory.

When film thicknesses are evaluated, the optical properties of three kinds of the sunlight shielding solids A to O having different film thicknesses are measured as three point-plotting, and a solar radiation transmittance and haze values when a visual light transmittance is standardized as 75% are calculated by the three-point plotting.

Measurement results of the optical properties of the obtained sunlight shielding solid samples A to O are shown in FIG. 1.

As shown in FIG. 1, the sunlight shielding solids showing such excellent optical properties as less than 60% of the solar radiation transmittance and less than 1% of the haze value are samples A to G and K to O. Especially, samples C to E, L and M showed such more excellent optical properties as less than 56.5% of the solar radiation transmittance and less than 0.8% of the haze value.

From the results described above, the formed sunlight shielding solids are found to exhibit the desired optical characteristics when the crystallite sizes of the ATO fine particles are 4 to 125 nm, preferably 5 to 80 nm, and more preferably 6 to 60 nm, and when the specific surface areas thereof are 5 to 110 m$^2$/g, preferably 10 to 90 m$^2$/g, and more preferably 20 to 70 m$^2$/g.

INDUSTRIAL AVAILABILITY

As described above in detail, antimony tin oxide fine particles for sunlight shielding according to the present invention, which has a size of a crystallite constituting the fine particles of 4 to 125 nm, and a specific surface area of the fine particles of 5 to 110 m$^2$/g are formed on a transparent substrate or in the substrate by an appropriate method so that a sunlight shielding solid having such optical properties as a high visible light transmittance, a low solar radiation transmittance, and simultaneously a low haze value can be formed.

The invention claimed is:

1. A disperse liquid for formation of a sunlight shielding solid, comprising:
   antimony tin oxide fine particles dispersed in a solvent, wherein:
   a size of a crystallite constituting said fine particles is 4 to 125 nm;
   a specific surface area of said fine particles is 5 to 110 m$^2$/g;
   a dispersed particle size of said fine particles is 130 nm or less: and
   in a color of powders containing said antimony tin oxide fine particles according to an L* a* b* color specification system:
   L* is 45 to 65,
   a* is −5 to −1, and
   b* is −11 to −1.

2. The disperse liquid according to claim 1, further comprising an inorganic binder and/or a resin binder.

3. A sunlight shielding solid, wherein the sunlight shielding solid is formed by using the disperse liquid for formation of the sunlight shielding solid according to claim 2.

4. A sunlight shielding solid, wherein the sunlight shielding solid is formed by using the disperse liquid for formation of the sunlight shielding solid according to claim 1.

5. A transparent substrate for sunlight shielding, wherein the sunlight shielding solid according to claim 4 is formed.

6. The sunlight shielding solid according to claim 4, wherein a film of a silicon oxide, a zirconium oxide, a titanium oxide, or an aluminum oxide is formed on the sunlight shielding solid.

7. The sunlight shielding solid according to claim 6, wherein a solar radiation transmittance in a wavelength band of 300 to 2100 nm is less than 60% and a haze value is less than 1% when a visual light transmittance is 70% or more.

8. A transparent substrate for sunlight shielding, wherein the sunlight shielding solid according to claim 6 is formed.

9. The sunlight shielding solid according to claim 4, wherein a solar radiation transmittance in a wavelength band of 300 to 2100 nm is less than 60% and a haze value is less than 1% when a visual light transmittance is 70% or more.

10. A transparent substrate for sunlight shielding, wherein the sunlight shielding solid according to claim 9 is formed.

* * * * *